(12) United States Patent
Mizumori (10) Patent No.: US 8,849,098 B2
(45) Date of Patent: Sep. 30, 2014

(54) RECORDING APPARATUS

(75) Inventor: Ryuta Mizumori, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 1105 days.

(21) Appl. No.: 12/204,738

(22) Filed: Sep. 4, 2008

(65) Prior Publication Data

US 2009/0060457 A1    Mar. 5, 2009

(30) Foreign Application Priority Data

Sep. 5, 2007    (JP) .................................. 2007-230615

(51) Int. Cl.

| | | |
|---|---|---|
| *H04N 5/91* | (2006.01) | |
| *H04N 5/85* | (2006.01) | |
| *H04N 5/781* | (2006.01) | |
| *H04N 5/907* | (2006.01) | |
| *H04N 5/765* | (2006.01) | |
| *G11B 27/034* | (2006.01) | |
| *H04N 5/77* | (2006.01) | |
| *H04N 1/21* | (2006.01) | |
| *H04N 21/433* | (2011.01) | |
| *H04N 7/173* | (2011.01) | |

(52) U.S. Cl.
CPC ................. *H04N 5/781* (2013.01); *H04N 5/85* (2013.01); *G11B 2220/2537* (2013.01); *H04N 5/772* (2013.01); *H04N 5/907* (2013.01); *H04N 1/21* (2013.01); *H04N 5/765* (2013.01); *G11B 27/034* (2013.01); *G11B 2220/61* (2013.01); *H04N 21/4332* (2013.01); *H04N 7/17318* (2013.01); *G11B 2220/455* (2013.01); *G11B 2220/2516* (2013.01)
USPC ........... 386/292; 386/235; 386/296; 386/341; 386/200

(58) Field of Classification Search
CPC .. H04N 1/21; H04N 21/4332; H04N 7/17318
USPC .......................... 386/200, 235, 292, 296, 341
See application file for complete search history.

(56) References Cited

U.S. PATENT DOCUMENTS

| | | | | |
|---|---|---|---|---|
| 5,862,342 | A * | 1/1999 | Winter et al. .................. | 709/231 |
| 2003/0152362 | A1 * | 8/2003 | Zantos ............................ | 386/52 |
| 2004/0252982 | A1 * | 12/2004 | Iwahara et al. ................ | 386/111 |
| 2005/0146630 | A1 * | 7/2005 | Min et al. .................. | 348/333.02 |
| 2006/0161595 | A1 * | 7/2006 | Sugimoto et al. ............. | 707/200 |
| 2006/0245751 | A1 * | 11/2006 | Nagaoka et al. .............. | 396/439 |
| 2008/0118223 | A1 * | 5/2008 | Kamiwada et al. ............ | 386/83 |

FOREIGN PATENT DOCUMENTS

| | | |
|---|---|---|
| JP | 2000-175150 A | 6/2000 |
| JP | 2002-025182 A | 1/2002 |
| JP | 2003-224813 A | 8/2003 |
| JP | 2006-164435 A | 6/2006 |

(Continued)

*Primary Examiner* — Carl Colin
*Assistant Examiner* — Gary Lavelle
(74) *Attorney, Agent, or Firm* — Canon USA, Inc. IP Division (57) ABSTRACT

A recording apparatus records data to a plurality of recording media including a first recording medium and a second recording medium. The recording apparatus includes an input unit configured to receive data, a recording/reproducing unit configured to record/reproduce data to/from the plurality of recording media, and a control unit configured to select, during a dubbing process of reading first data recorded on the first recording medium and recording the first data onto the second recording medium, in response to an instruction to record second data received by the input unit, a recording medium other than the second recording medium from among the plurality of recording media and to control the recording/reproducing unit to record the second data onto the selected recording medium.

10 Claims, 10 Drawing Sheets

(56) References Cited

FOREIGN PATENT DOCUMENTS

| JP | 2006-165897 | A |   | 6/2006 |
| JP | 2006-165897 | A | * | 6/2006 |
| JP | 2006-202357 |   | * | 8/2006 |
| JP | 2006-202357 | A |   | 8/2006 |
| JP | 2006-311195 | A |   | 11/2006 |

* cited by examiner

| DUBBING DIRECTION | |
|---|---|
| NO DUBBING | 0×00 |
| HDD → DVD | 0×01 |
| DVD → HDD | 0×02 |
| SD CARD → DVD | 0×03 |
| DVD → SD CARD | 0×04 |
| SD CARD → HDD | 0×05 |
| HDD → SD CARD | 0×06 |

FIG. 10B

| DUBBING PROCESS LIST | |
|---|---|
| DUBBING DIRECTION | 0×00 |
| TRANSFER COMPLETION COUNTER | 0×00 |
| TRANSFER TERMINATION INFORMATION | 0×00 |

FIG. 10C

| TRANSFER TERMINATION INFORMATION | |
|---|---|
| IN EXECUTION | 0×00 |
| TERMINATED | 0×01 |

RECORDING APPARATUS

BACKGROUND OF THE INVENTION

1. Field of the Invention

The present invention relates to recording apparatuses, and more particularly, to an apparatus that records data on a plurality of recording media.

2. Description of the Related Art

There have been disk recorders that record television programs on large-capacity hard disk drives (HDDs) and/or digital versatile disks (DVDs).

These types of disk recorders generally use an HDD, which has a larger capacity than a DVD, as a temporary recording medium.

That is, a user first records a program on the large-capacity HDD, and, after viewing the program recorded on the HDD, the user can delete the program. In addition, when there is a program that the user wants to save, the user can dub the program from the HDD to a DVD so that the user can save the program.

In recent years, camcorders that capture a moving image and record the moving image data on a plurality of recording media, such as an optical disk, a memory card, and an HDD have been appearing on the market.

For example, a camcorder that has an internal HDD and a DVD drive and that can record captured moving image data on both a DVD and the HDD is available. Such a camcorder which uses a plurality of recording media can dub moving image data recorded on the HDD to a DVD.

Accordingly, the technique for dubbing recorded image data between a plurality recording media has been proposed (for example, see Japanese Patent Laid-Open Nos. 2006-164435 and 2006-202357).

As in the foregoing case, there may be a situation where, while data is being dubbed between a plurality of media, the user may want to record a moving image.

It has been difficult to record a moving image while a dubbing process is being executed. Therefore, the dubbing process is interrupted, and then a moving image is recorded.

Accordingly, there is a problem that the user cannot complete the dubbing process within a scheduled time.

Also, while the dubbing process is being interrupted, the moving image may be recorded on a recording medium serving as a recording destination in the dubbing process.

Therefore, when the interrupted dubbing process is resumed after the recording of the moving image is terminated, there may be less free capacity available on the recording medium serving as the recording destination, and the entire data to be dubbed may not be recorded.

SUMMARY OF THE INVENTION

The present invention realizes a recording technique with which specified data can be dubbed, even when the dubbing process is interrupted and another item of data is recorded, after the dubbing process is resumed.

According to an aspect of the present invention, a recording apparatus that records data onto a plurality of recording media including a first recording medium and a second recording medium, includes: an input unit configured to receive data; a recording/reproducing unit configured to record/reproduce the data to/from the plurality of recording media; and a control unit configured to select, during a dubbing process of reading first data recorded on the first recording medium and recording the first data onto the second recording medium, in response to a recording instruction to record second data received by the input unit, a recording medium other than the second recording medium from among the plurality of recording media and to control the recording/reproducing unit to record the second data onto the selected recording medium.

According to another aspect of the present invention, a recording method for a recording apparatus including an input unit configured to receive data and a recording/reproducing unit configured to record/reproduce data to/from a plurality of recording media including a first recording medium and a second recording medium is provided. The recording method includes: receiving data; recording/reproducing the data to/from the plurality of recording media; selecting, during a dubbing process of reading first data recorded on the first recording medium and recording the first data onto the second recording medium, in response to an instruction to record data received by the input unit, a recording medium other than the second recording medium from among the plurality of recording media; and controlling the recording/reproducing unit to record the second data onto the selected recording medium.

Further features of the present invention will become apparent from the following description of exemplary embodiments with reference to the attached drawings.

BRIEF DESCRIPTION OF THE DRAWINGS

FIG. 6 (FIGS. 6A and 6B) is a flowchart showing a process performed in response to an instruction to start recording during the dubbing process.

DETAILED DESCRIPTION OF THE EMBODIMENTS

Exemplary embodiments of the present invention will now herein be described in detail below with reference to the drawings.

The embodiments described below are examples for carrying out the present invention. Various alternations or modifications can be made depending on the structure of an apparatus to which the present invention is applied and various conditions. The present invention is not limited to the following embodiments.

Figure 1:
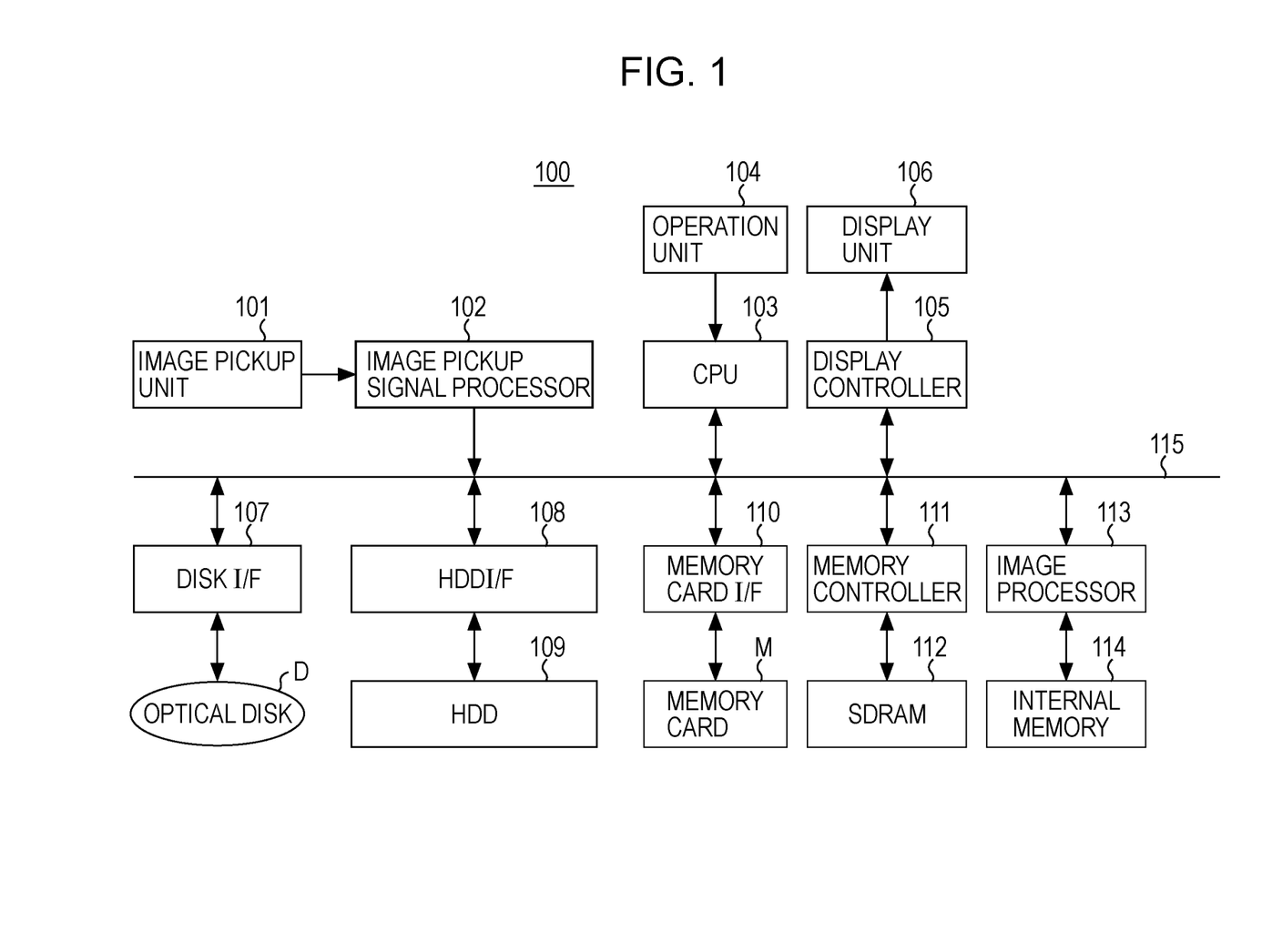
FIG. 1 is a block diagram showing the structure of a camcorder according to an embodiment of the present invention.

FIG. 1 is a block diagram showing the structure of a camcorder 100 according to an embodiment of the present invention.

An image pickup unit 101 is implemented by a charge-coupled device (CCD) or complementary metal-oxide semiconductor (CMOS) sensor and generates a moving image signal by performing photoelectric conversion of a subject image input through a lens. An image pickup signal processor 102 applies predetermined processing on the moving image signal output from the image pickup unit 101 and outputs the processed signal. Also, the image pickup signal processor 102 generates and outputs a still image signal representing one screen when recording a still image. A central processing unit (CPU) 103 controls the components of the camcorder 100. An operation unit 104 includes various operation switches.

A display controller 105 displays, on a display unit 106, a moving image being captured or reproduced or various items of information including menus using a graphical user interface (GUI). The display unit 106 is implemented by, for example, a liquid crystal panel and plays the role of a visual interface for a user by displaying various items of information.

A disk interface (I/F) 107 executes, in accordance with a command from the CPU 103, reading and writing of various items of data from/to an optical disk D. In the present embodiment, the optical disk D is a removable disk, such as a DVD, which has a capacity of about a few GB to a few tens of GB. The optical disk D can be freely mounted to or ejected from the camcorder 100 using a mounting/ejection mechanism (not shown).

An HDD I/F 108 executes, in accordance with a command from the CPU 103, reading and writing of various items of data from/to an HDD 109. The HDD 109 is a large-capacity HDD which has a storage capacity of a few tens to a few hundreds of GB and can store various items of data including moving image data.

A memory card I/F 110 executes, in accordance with a command from the CPU 103, reading and writing of various items of data from/to a memory card M. In the present embodiment, the memory card M can be freely mounted to or ejected from the camcorder 100 using a card slot (not shown).

The memory card M includes a large-capacity non-volatile memory chip having a storage capacity of a few GB to a few tens of GB and can store various items of data including moving image data.

A memory controller 111 controls, in accordance with a command from the CPU 103, storage and reading of data to/from a synchronous dynamic random access memory (SDRAM) 112. The SDRAM 112 is mainly used as a buffer memory when recording moving image data.

An image processor 113 generates, when recording a moving image, moving image data that is suitable for being recorded by encoding and compressing the moving image signal output from the image pickup signal processor 102 using an encoding system, such as the Moving Picture Experts Group (MPEG). Also, when reproducing a moving image, the image processor 113 decodes moving image data reproduced from the optical disk D, the HDD 109, or the memory card M, expands the amount of information, and converts the data into a format that is suitable for being displayed.

Also, when recording a still image, the image processor 113 generates still image data that is suitable for being recorded by encoding and compressing the still image signal output from the image pickup signal processor 102 using an encoding system, such as the Joint Photographic Experts Group (JPEG). Also, when reproducing a still image, the image processor 113 decodes still image data reproduced from the optical disk D, the HDD 109, or the memory card M, expands the amount of information, and converts the data into a format that is suitable for being displayed.

An internal memory 114 stores information used by the image processor 113 when processing moving image data. Also, since the internal memory 114 is directly connected to the image processor 113, the image processor 113 can execute processes at high speeds. A data bus 115 transfers moving image data and various items of data among blocks.

Note that the camcorder 100 shown in FIG. 1 can also record sound when capturing a moving image and reproduce the recorded sound. An available structure is used to implement a block for processing audio data, a detailed description of which is not provided herein.

Figure 2:
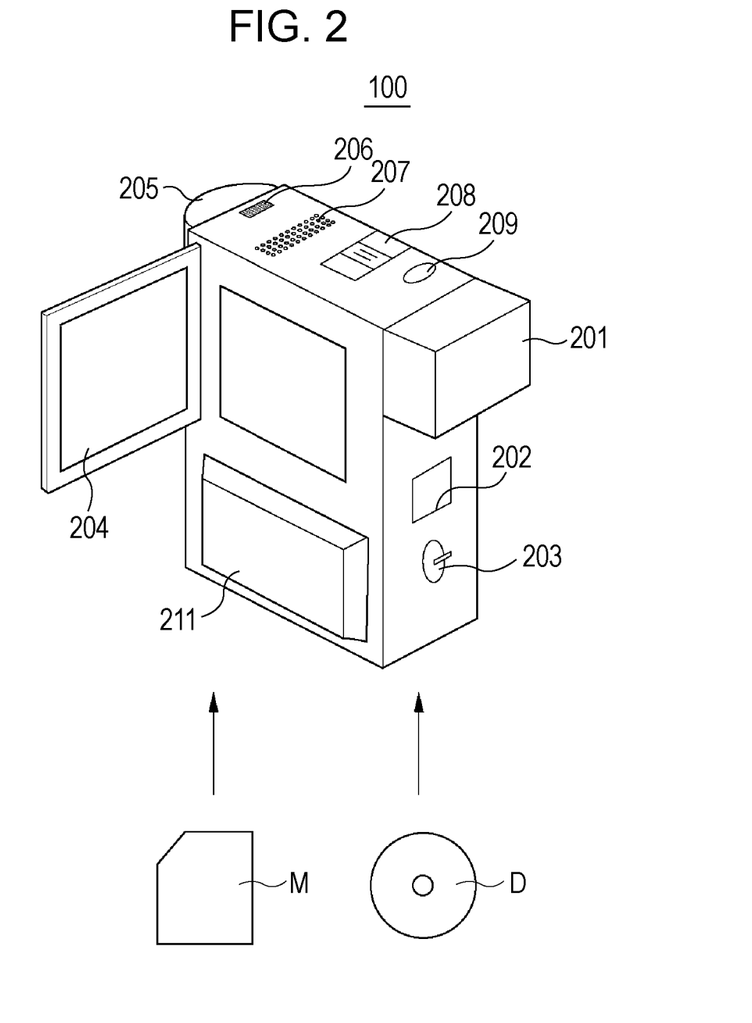
FIG. 2 is an external view of the camcorder according to the embodiment.

FIG. 2 is an external view of the camcorder 100.

Referring to FIG. 2, a main body of the camcorder 100 contains an HDD. Moving image data captured by the image pickup unit 101 shown in FIG. 1 can be recorded on the HDD.

A lens unit 205 is included in the image pickup unit 101 shown in FIG. 1. An electronic viewfinder (EVF) 201 is also provided. When capturing or reproducing a moving image, the user can view it by looking at the EVF 201.

A liquid crystal panel 204 displays a moving image being recorded or reproduced when a recording or reproducing process is performed. Accordingly, the user can view the image being recorded or reproduced. By displaying additional items of information indicating a recording time and the remaining amount of battery, the user can be informed of the state of the camcorder 100.

The EVF 201 and the liquid crystal panel 204 are included in the display unit 106 shown in FIG. 1.

A mode changing switch 203 is provided. The camcorder 100 according to the present embodiment has a recording mode (image capturing mode) and a reproducing mode as selectable modes that can be selected using the mode changing switch 203. By operating the mode changing switch 203, the user can record/reproduce moving image data.

A start/stop button 202 is provided. By pressing the start/stop button 202, the user can give an instruction to start or stop recording a moving image. A still image shooting button 209 is provided. By pressing the still image shooting button 209, the user can record still image data on a recording medium such as the above-described optical disk D, the HDD 109, or the memory card M.

A zoom lever 208 is provided. When the mode changing switch 203 is set to the recording mode, the wide angle and telescopic feature of moving image data being recorded can be adjusted. In contrast, when the mode changing switch 203 is set to the reproducing mode, the reproducing zoom of moving image data being reproduced can be adjusted, and the screen can be changed to an index display screen.

The start/stop button 202, the mode changing switch 203, the zoom lever 208, and the still image shooting button 209 are included in the operation unit 104 shown in FIG. 1.

The user can reproduce desired moving image data and still image data and execute a dubbing process between any two of the optical disk D, the HDD 109, and the memory card M.

A microphone 206 records audio data together with moving image data. A loudspeaker 207 is used to reproduce the audio data recorded together with the moving image data when reproducing the moving image data recorded on a recording medium.

A battery 211 supplies power necessary for the camcorder 100 to operate.

With the memory card M or the optical disk D being mounted onto the camcorder 100, moving image data and still image data can be recorded/reproduced.

In addition, the camcorder 100 contains the HDD 109. Therefore, the camcorder 100 can record/reproduce moving image data and still image data to/from the internal HDD 109.

By operating the operation unit 104, the user can select a recording medium serving as a recording destination from among the optical disk D, the HDD 109, and the memory card M.

By operating the operation unit 104, the user can select a recording medium serving as a reproducing source from among the optical disk D, the HDD 109, and the memory card M.

Note that, when the optical disk D and/or the memory card M is not mounted, the unmounted medium/media cannot be selected.

By operating the operation unit 104, the user can select the image quality of moving image data to record from among a plurality of preset image quality levels. In the present embodiment, one of two image quality modes, namely, a standard image quality mode and a high image quality mode, is selected. When the high image quality mode is set, a target data rate of moving image data to record is higher than that in the standard image quality mode, and the amount of data of moving image data per unit time is also larger than that in the standard image quality mode.

Next, a moving image recording process and a moving image reproducing process performed with the camcorder 100 will now be described.

In a state where power is switched on using the operation unit 104 and the mode is switched to the recording mode, when the user gives an instruction to start recording, the CPU 103 outputs commands to the components.

The image processor 113 encodes a moving image signal output from the image pickup signal processor 102. The image processor 113 records the encoded moving image data on the SDRAM 112 using the memory controller 111. When a predetermined amount of moving image data is stored on the SDRAM 112, the CPU 103 reads and outputs the moving image data to a recording medium selected from among the optical disk D, the HDD 109, and the memory card M and outputs the moving image data.

Specifically, when the optical disk D has been selected, the CPU 103 outputs moving image data read from the SDRAM 112 to the disk I/F 107. The disk I/F 107 writes the moving image data to the optical disk D.

Alternatively, when the HDD 109 has been selected, the CPU 103 outputs moving image data read from the SDRAM 112 to the HDD I/F 108. The HDD I/F 108 writes the moving image data to the HDD 109.

Alternatively, when the memory card M has been selected, the CPU 103 outputs moving image data read from the SDRAM 112 to the memory card I/F 110. The memory card I/F 110 writes the moving image data to the memory card M.

When the operation unit 104 gives an instruction to stop recording, the CPU 103 stops recording the moving image data to the selected recording medium. In the present embodiment, the moving image data recorded on the optical disk D, the HDD 109, or the memory card M is managed as a file. Furthermore, a series of items of moving image data recorded during a period from the giving of an instruction to start recording to the giving of an instruction to stop recording is managed as one file.

In the present embodiment, the CPU 103 reads, from each recording medium, management information for managing files of moving image data recorded on the recording medium and controls the recording/reproducing operation in accordance with the management information. The management information includes information indicating the size, recording position, and file name of moving image data recorded on the recording medium and information indicating the free capacity of the recording medium available for recording data.

Next, a reproducing process will be described.

When power is switched on using the operation unit 104 and the mode is switched to the reproducing mode, the CPU 103 displays an index screen showing a list of items of moving image data recorded on a selected recording medium on the display unit 106.

More specifically, when the optical disk D has been selected, the disk I/F 107 reproduces the head portion of each item of moving image data recorded on the optical disk D, and the image processor 113 decodes the reproduced data. By reducing the size of the decoded screen data at the head portion, a thumbnail image to be displayed on an index screen is generated. The display controller 105 generates an index screen using the thumbnail image and displays it on the display unit 106.

Alternatively, when the HDD 109 has been selected, the HDD I/F 108 reproduces the head portion of each item of moving image data recorded on the HDD 109, and the image processor 113 decodes the reproduced data. By reducing the size of the decoded screen data at the head portion, a thumbnail image to be displayed on an index screen is generated. The display controller 105 generates an index screen using the thumbnail image and displays it on the display unit 106.

Alternatively, when the memory card M has been selected, the memory card I/F 110 reproduces the head portion of each item of moving image data recorded on the memory card M, and the image processor 113 decodes the reproduced data. By reducing the size of the decoded screen data at the head portion, a thumbnail image to be displayed on an index screen is generated. The display controller 105 generates an index screen using the thumbnail image and displays it on the display unit 106.

In contrast, when recording moving image data, a thumbnail image for an index screen may be generated using the head screen of the moving image data being recorded, and the generated thumbnail image may be recorded together with the moving image data. In that case, at the time of reproduction, the thumbnail image may be reproduced from the recording medium, and an index screen may be generated using the reproduced thumbnail image.

In this manner, when the index screen is displayed on the display unit 106, the user operates the operation unit 104 to select a thumbnail image corresponding to a desired moving image and to give an instruction to start reproducing the desired moving image.

In response to a reproducing start instruction, the CPU 103 controls the disk I/F 107, the HDD I/F 108, or the memory card I/F 110 so as to reproduce moving image data corresponding to the specified thumbnail image from the selected recording medium.

The reproduced moving image data is sent to the image processor 113. The image processor 113 decodes the reproduced moving image data and sends the decoded moving image data to the display controller 105. The display controller 105 displays the reproduced moving image on the display unit 106.

Next, a dubbing process performed with the camcorder 100 will be described.

Figure 3:
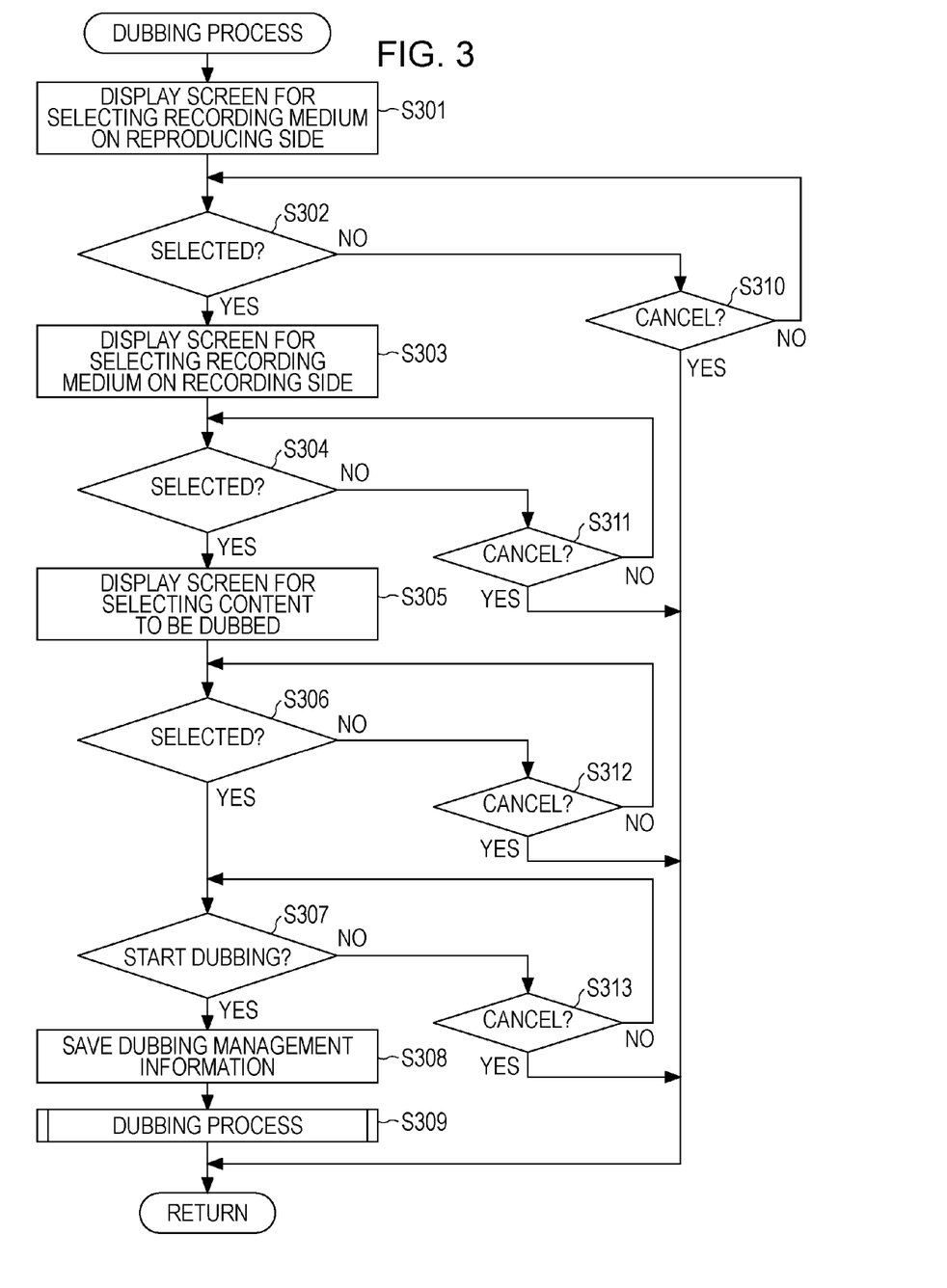
FIG. 3 is a flowchart showing a dubbing process.

In both the recording mode and the reproducing mode, a dubbing process can be executed in response to a user operation entered through the operation unit 104. FIG. 3 is a flowchart showing a process performed with the camcorder 100 in a dubbing process. The process shown in FIG. 3 is executed by controlling the components using the CPU 103.

When the user operates a menu button of the operation unit 104 to give an instruction to set a dubbing mode, the CPU 103 controls the display controller 105 to display on the display unit 106 a screen for selecting a recording medium on the reproducing side (S301). When the optical disk D and/or the memory card M is not mounted, the unmounted medium/media are not displayed. When none of the optical disk D and the memory card M are mounted, this screen for selecting a recording medium on the reproducing side is not displayed, and a warning screen indicating that the dubbing process cannot be executed is displayed on the display unit 106.

When a recording medium on the reproducing side is selected (yes in S302), a screen for selecting a recording medium on the recording side is displayed on the display unit 106 (S303). When a recording medium on the recording side is selected (yes in S304), a screen for selecting a moving image(s) to be dubbed is displayed on the display unit 106 (S305). The screen includes thumbnail images representing moving images recorded on the recording medium selected as the recording medium on the reproducing side.

By operating the operation unit 104, the user selects a desired moving image(s) to be dubbed from among items of moving image data recorded on the recording medium on the reproducing side. In this case, the CPU 103 compares the total amount of the selected moving image data to be dubbed with the free capacity available on the recording medium on the recording side and determines whether the selected moving image data can be recorded on the recording medium on the recording side. When the selected recording medium on the recording side is insufficient for recording the selected moving image data, a warning indicating this insufficient state is displayed on the selection screen.

In this manner, moving image data to be dubbed is selected (yes in S306). When an instruction to start dubbing is given (yes in S307), the CPU 103 generates dubbing management information and saves the generated dubbing management information on the HDD 109 (S308). The dubbing management information includes information indicating a dubbing direction indicating the recording media on the reproducing side and the recording side, the file name and file size of each item of moving image data to be dubbed, and the sequence of dubbing.

Then, the dubbing process starts (S309).

In the dubbing mode, the dubbing mode can be terminated at any time when the user gives a cancel instruction (S310, S311, S312, and S313).

Next, the dubbing process performed in S309 is described.

Figure 4:
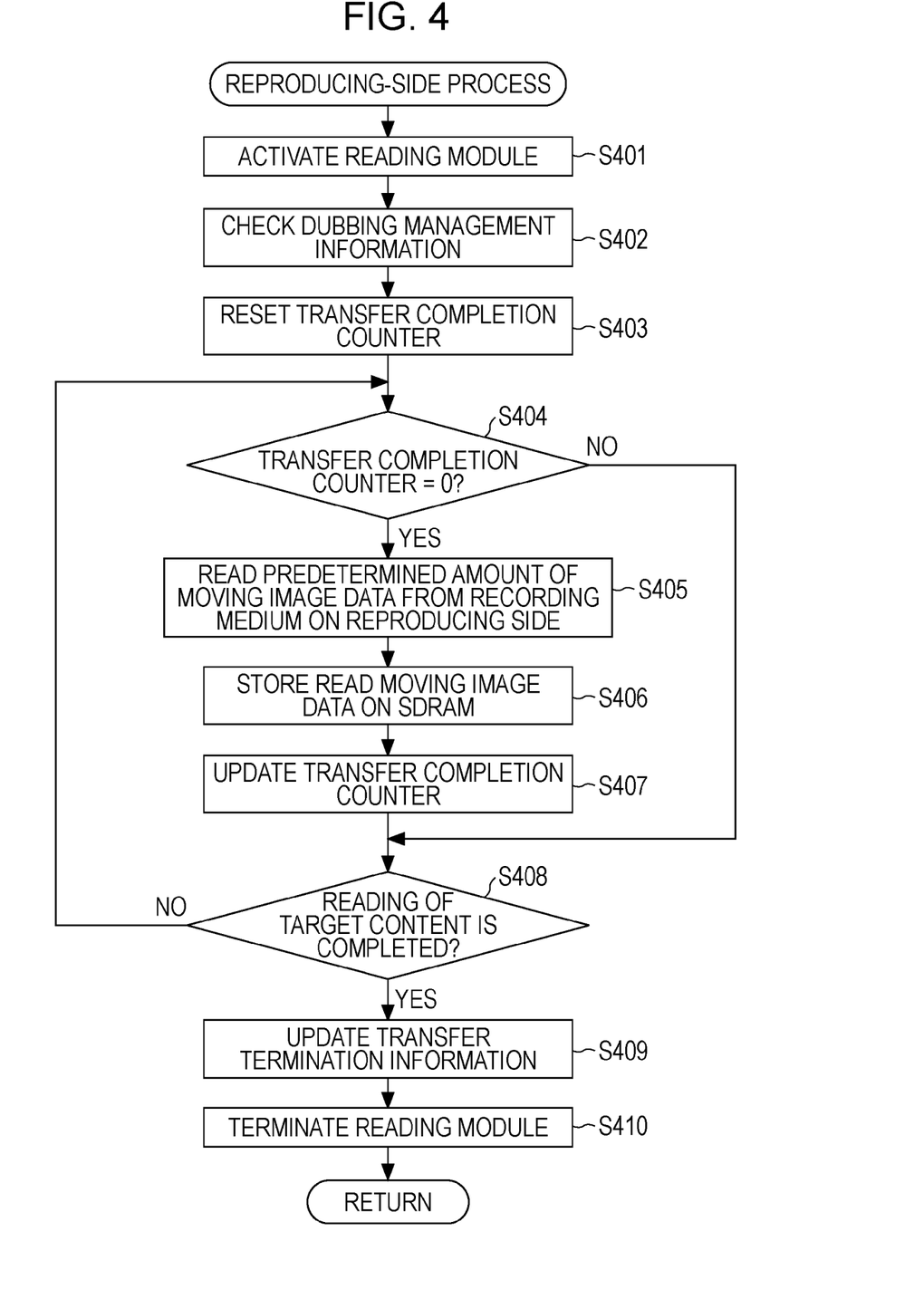
FIG. 4 is a flowchart showing a reproducing-side process in the dubbing process.
Figure 5:
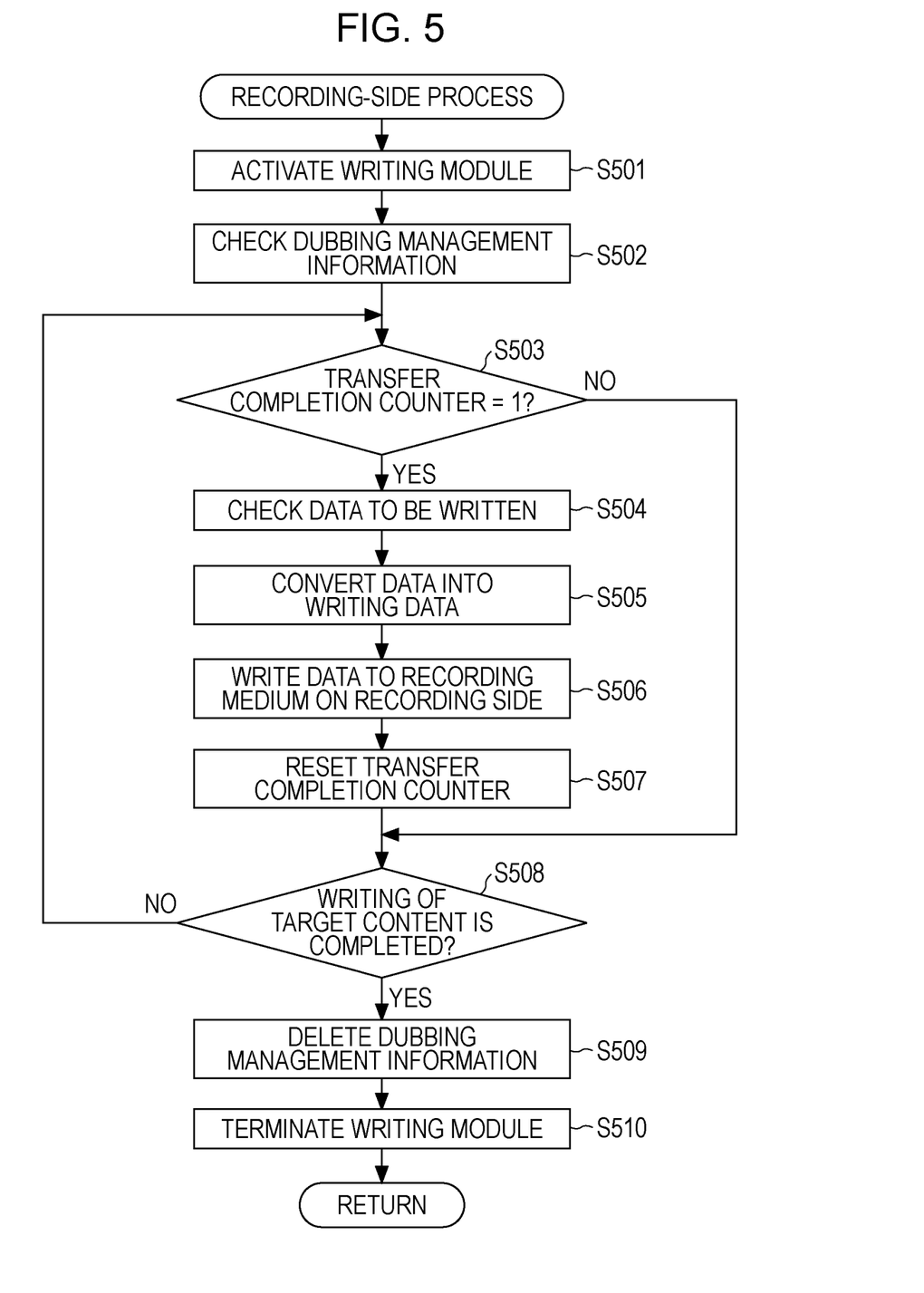
FIG. 5 is a flowchart showing a recording-side process in the dubbing process.

FIGS. 4 and 5 are flowcharts showing the dubbing process. That is, FIG. 4 shows a process on the reproducing side, and FIG. 5 shows a process on the recording side. The processes shown in FIGS. 4 and 5 are executed by controlling the components using the CPU 103.

The dubbing process in the present embodiment is realized by a module that reads moving image data from the recording medium on the reproducing side (hereinafter this module may also be called the "moving image reading module" or "reading module") and a module that converts the read moving image data into a recording format and writes the converted moving image data to the recording medium on the recording side (hereinafter this module may also be called the "writing module").

First, the process on the reproducing side is described.

When the dubbing process starts, the moving image reading module is activated (S401). This module may be dedicated hardware or software running on the CPU 103. In the present embodiment, this module is implemented by software by way of example.

Next, the CPU 103 checks the dubbing direction and the data to be dubbed based on the dubbing management information saved on the HDD 109 (S402). Then, the CPU 103 resets a transfer completion counter indicating completion of writing reproduced data to the SDRAM 112 (S403). The CPU 103 generates a dubbing process list including information indicating the dubbing direction, the transfer completion counter, and transfer termination information (shown in FIG. 10B and described later) and saves the generated dubbing process list on the SDRAM 112.

Figure 10A:
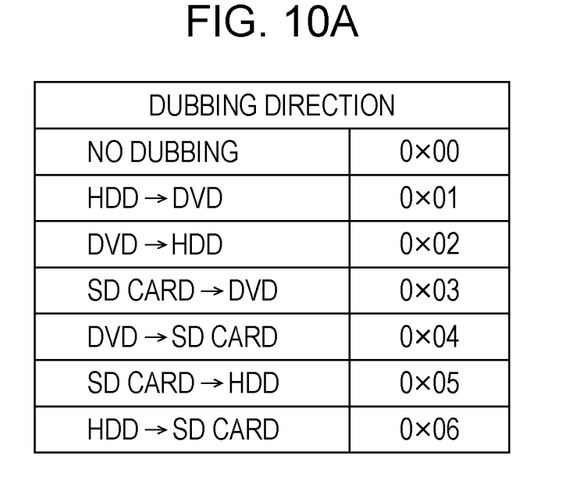
FIGS. 10A to 10C are diagrams showing various items of information used in the dubbing process.
Figure 10B:
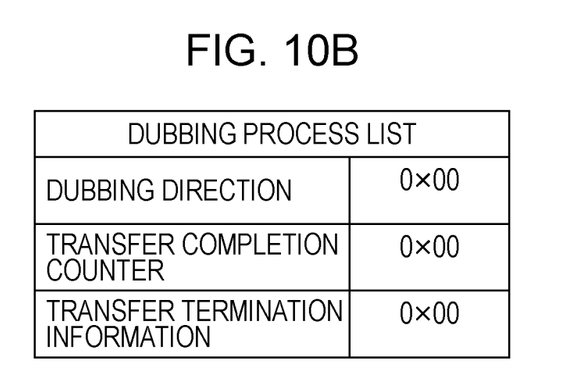

Information indicating the dubbing direction is shown in FIG. 1A, and the details of the dubbing process list are shown in FIG. 10B.

For example, when data is to be dubbed from the HDD 109 to the optical disk D (e.g., a DVD), the value "0×01" is set as the dubbing direction.

Next, the CPU 103 determines whether the value of the transfer completion counter, which is stored in the SDRAM 112, is zero (S404). In the present embodiment, as will be described later, the value of the transfer completion counter is set to a predetermined value every time a predetermined amount of data is read from the recording medium on the reproducing side and stored on the SDRAM 112. Here, "1" is set as the predetermined value. The value of the transfer completion counter is reset to zero every time writing of data stored on the SDRAM 112 to the recording medium on the recording side is completed.

Therefore, when the value of the transfer completion counter is zero, it means that the writing of data stored on the SDRAM 112 is completed.

When the value of the transfer completion counter is zero (yes in S404), a predetermined amount of moving image data is read from the recording medium on the reproducing side (S405). The read moving image data is stored on the SDRAM 112 (S406). In this case, the amount of data to be read in one reading is determined on the basis of the amount of data that can be stored on the SDRAM 112. In the present embodiment, after the moving image data to be dubbed is read in units of predetermined amounts and stored on the SDRAM 112, the data is read from the SDRAM 112 and recorded onto the recording medium on the recording side. Accordingly, reading and writing of the moving image data are performed a plurality of times.

When the storage of the data onto the SDRAM 112 is completed, the transfer completion counter is set to the predetermined value and updated (S407).

The reading position of the moving image data which has been completely read is compared with the recording position of the data to be dubbed, which is included in the dubbing management information, and it is determined whether the reading of the entire target data is completed (S408). When the reading is not completed (no in S408), the flow returns to S404.

When the reading of the entire target data is completed (yes in S408), the transfer termination information saved on the SDRAM 112 is set to a predetermined value and updated (S409), and the reading module is terminated (S410).

Figure 10C:
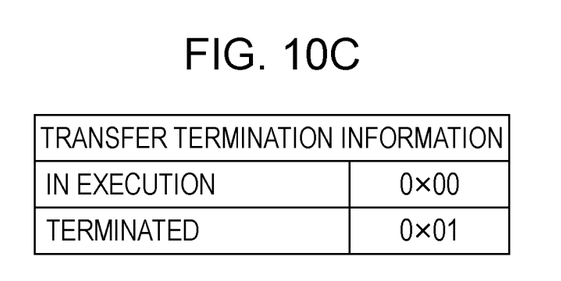

Here, the transfer termination information is set to a value corresponding to the type shown in FIG. 10C. When the reading is completed, the value "0×01" is set. Accordingly, the writing module, which will be described later, can determine whether there still is moving image data to dub.

Next, the process on the recording side is described.

First, the writing module is activated (S501). As in the moving image data reading module, the writing module may be dedicated hardware or software running on the CPU 103. In the present embodiment, the description assumes that the writing module is software.

Next, the CPU 103 checks the dubbing direction and the data to be dubbed based on the dubbing management information stored on the HDD 109 (S502). Also, the CPU 103 determines whether the value of the transfer completion counter is the predetermined value (S503).

When the value of the transfer completion counter is the predetermined value (yes in S503), the CPU 103 checks the moving image data stored on the SDRAM 112 (S504) and converts it into a format suitable for the recording medium serving as the recording destination using the image processor 113 (S505). Then, the CPU 103 reads the converted moving image data from the SDRAM 112 and writes it onto the recording medium on the recording side (S506).

After writing the entire moving image data stored on the SDRAM 112 onto the recording medium on the recording side, the CPU 103 resets the value of the transfer completion counter (S507). On the basis of the transfer termination information, the CPU 103 determines whether the writing of the moving image data to be dubbed is completed (S508). When the writing is not completed (no in S508), the flow returns to S503.

When the writing of the entire target data is completed (yes in S508), the CPU 103 deletes the dubbing management information saved on the HDD 109 (S509) and terminates the writing module (S510).

When the value of the transfer completion counter is not the predetermined value in S503, it means that no moving image data to be dubbed is stored on the SDRAM 112. Thus, the flow proceeds to S508.

Next, a process performed in the case where, while such a dubbing process is being executed, an additional request is made by the user to record a moving image will be described.

In the present embodiment, even during a dubbing process, an image capturing process can be performed by operating, by the user, the start/stop button 202. When a recording instruction is given during a dubbing process, regardless of the recording medium serving as the recording destination selected by the user in the recording mode, image data is recorded on the recording medium on the reproducing side in the dubbing process.

During a dubbing process, information indicating that the dubbing process is being executed is displayed on the display unit 106. However, when the user operates the start/stop button 202, instead of the information indicating that the dubbing process is being executed, an image output from the image pickup unit 101 is displayed.

Figures 6, 6A:
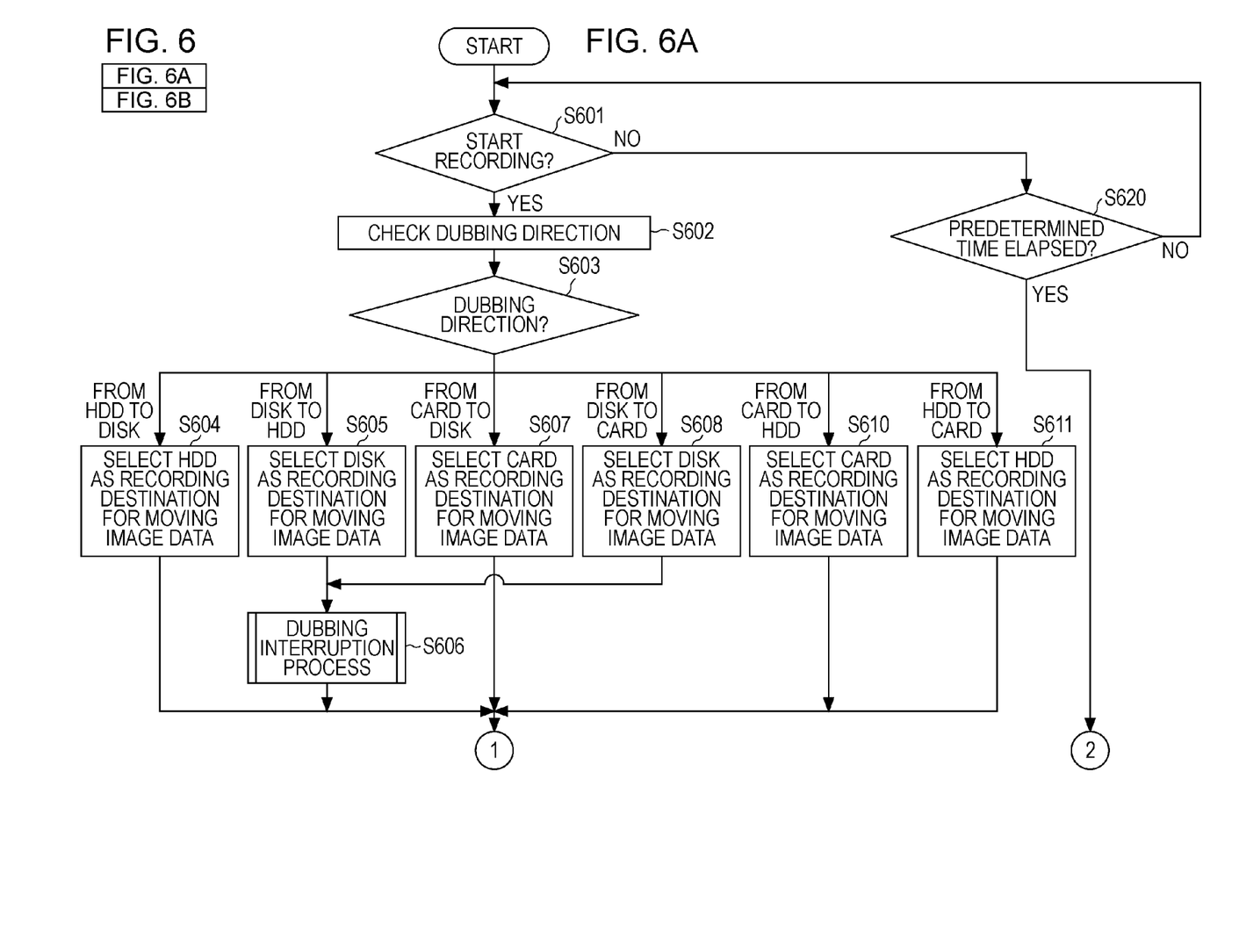

FIG. 6 (FIGS. 6A and 6B) is a flowchart showing a process performed in response to an instruction given by the user to start recording during the dubbing process. The process shown in FIG. 6 is executed by controlling the components using the CPU 103.

First, when the user operates the start button 202 during the dubbing process, the CPU 103 receives a moving image recording start request and displays a captured moving image on the display unit 106. Then, the CPU 103 waits for a recording start instruction (S601) (FIG. 6A).

Figure 6B:
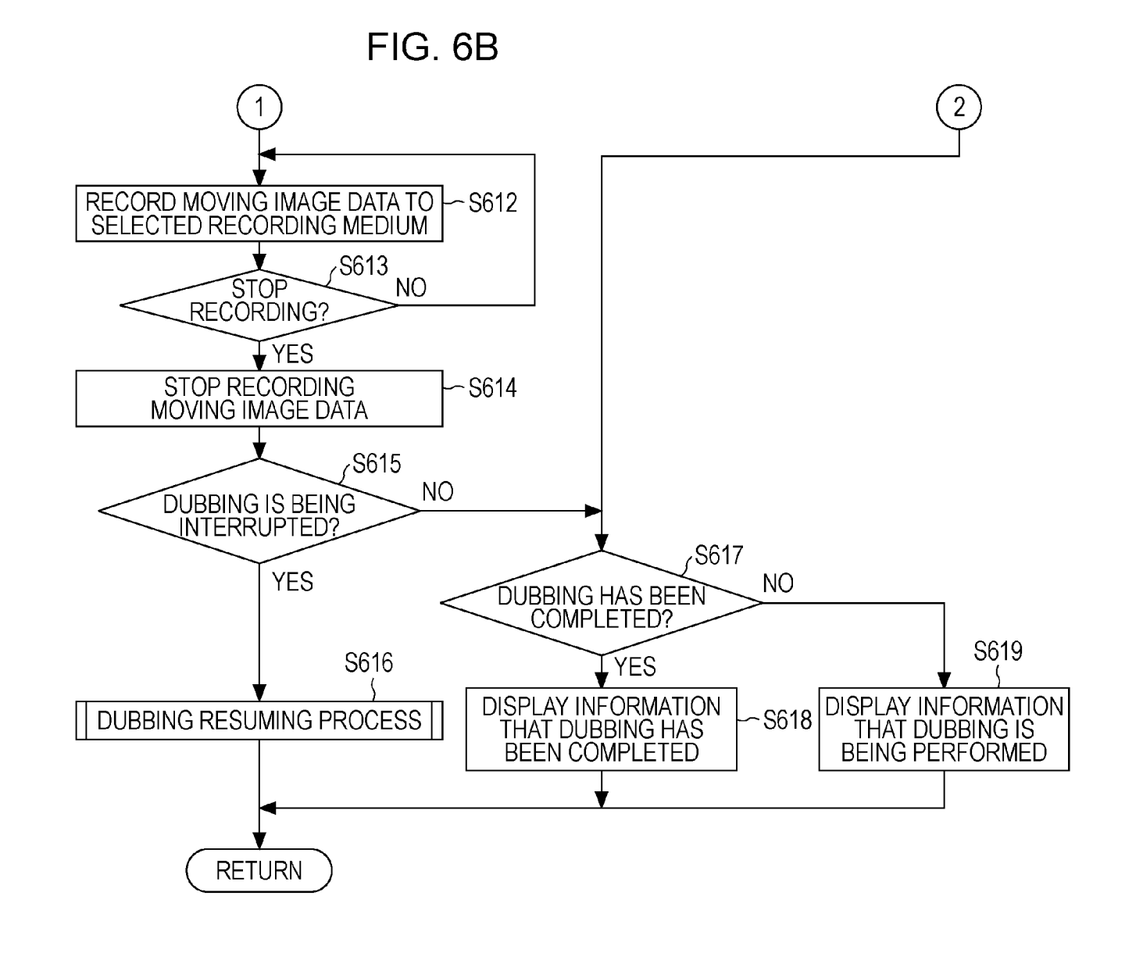

When a predetermined time elapses without any recording start instruction being given (yes in S620 of FIG. 6A), the CPU 103 determines whether the dubbing process has been completed (S617 of FIG. 6B). When the dubbing process has been completed (yes in S617), the CPU 103 displays, instead of the captured moving image, a screen indicating that the dubbing process has been completed on the display unit 106 (S618). When the dubbing process has not been completed (no in S617), the CPU 103 displays, instead of the captured moving image, a screen indicating that the dubbing process is being executed on the display unit 106 (S619).

When a recording start instruction is given in S601 (FIG. 6A), the CPU 103 checks the information indicating the dubbing direction, which is saved on the SDRAM 112 (S602). The CPU 103 determines the dubbing direction (S603). When the dubbing direction is from the HDD 109 to the optical disk D, the CPU 103 selects the HDD 109 as the recording destination for the moving image data (S604).

When the dubbing direction is from the optical disk D to the HDD 109, the CPU 103 selects the optical disk D as the recording destination for the moving image data (S605). The CPU 103 executes a dubbing interruption process (S606).

When the dubbing direction is from the optical disk D to the HDD 109, the dubbing process is interrupted because the data recordable/reproducible rate is reduced due to pickup movement involved in reading/writing data from/to the optical disk D. When the moving image data is recorded onto the optical disk D, the data may not be read from the optical disk D. Therefore, in the present embodiment, the dubbing process is interrupted when the optical disk D is selected as the recording destination.

Figure 7:
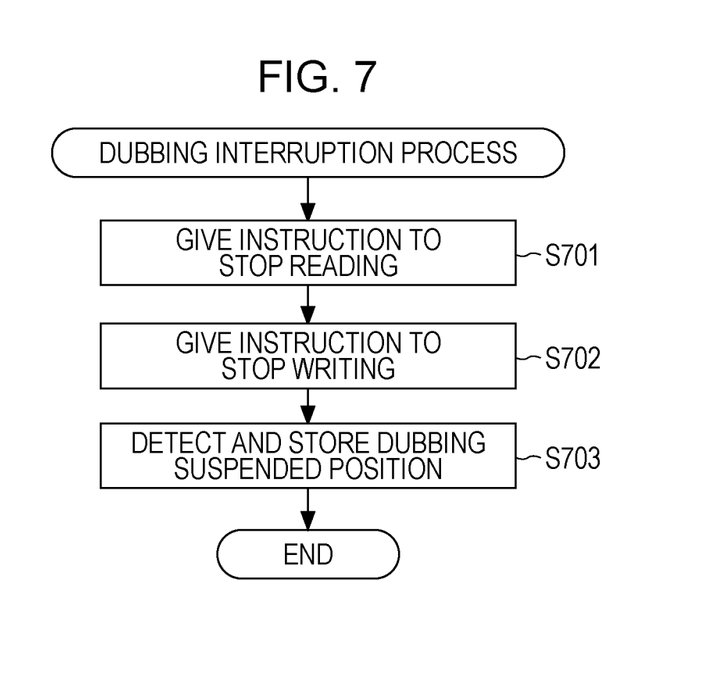
FIG. 7 is a flowchart showing a dubbing interruption process.

The dubbing interruption process is described using the flowchart shown in FIG. 7.

The CPU 103 instructs the reading module to stop reading data from the recording medium on the reproducing side (S701). The CPU 103 then instructs the writing module to stop writing data to the recording medium on the recording side (S702). The CPU 103 detects information indicating, in the data selected to be dubbed, the position up to which the dubbing process has been completed at the present (dubbing suspended position), and saves this information on the SDRAM 112 (S703).

In response to a reading stop instruction, the reading module stores a predetermined amount of the moving image data on the SDRAM 112 in S406 of FIG. 4 and interrupts the process at the time the value of the transfer completion counter (shown in FIG. 10B) is updated in S407.

In response to a writing stop instruction, after completing the writing of the data in S506 of FIG. 5, the writing module interrupts the process at the time the value of the transfer completion counter is reset in S507.

Referring back to FIG. 6 (FIG. 6A), when the dubbing direction is from the memory card M to the optical disk D, the CPU 103 selects the memory card M as the recording destination for the moving image data (S607).

When the dubbing direction is from the optical disk D to the memory card M, the CPU 103 selects the optical disk D as the recording destination for the moving image data (S608). The CPU 103 executes a dubbing interruption process (S606).

When the dubbing direction is from the memory card M to the HDD 109, the CPU 103 selects the memory card M as the recording destination for the moving image data (S610). When the dubbing direction is from the HDD 109 to the memory card M, the CPU 103 selects the HDD 109 as the recording destination for the moving image data (S611).

Next, as in a normal recording process, the CPU 103 records the moving image data on the selected recording medium (S612 of FIG. 6B) and, in response to a recording stop instruction (yes in S613), the CPU 103 stops recording (S614).

After the Recording is Stopped, the CPU 103 determines whether the dubbing process is being interrupted (S615). When the dubbing process is being interrupted (yes in S615), the CPU 103 resumes the dubbing process (S616).

Figure 8:
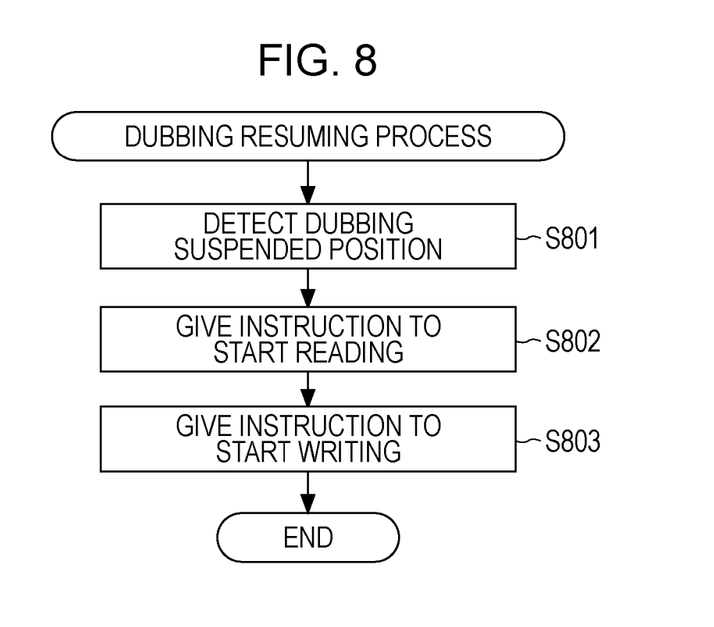
FIG. 8 is a flowchart showing a dubbing resuming process.

A dubbing resuming process is described using the flowchart shown in FIG. 8.

The CPU 103 detects the information indicating the dubbing suspended position and the dubbing direction saved on the SDRAM 112 (S801). The CPU 103 instructs the reading module to start reading data from the dubbing suspended position (S802). The CPU 103 instructs the writing module to start a writing process (S803).

Referring back to FIG. 6 (FIG. 6B), when the dubbing process is not being interrupted (no in S615), the CPU 103 determines whether the dubbing process has been completed during the recording of the moving image data (S617). When the dubbing process has been completed (yes in S617), the CPU 103 displays information indicating that the dubbing process has been completed on the display unit 106 (S618). When the dubbing process has not been completed (no in S617), the CPU 103 displays a screen indicating that the dubbing process is being executed on the display unit 106 and continues with the dubbing process (S619).

In this manner, according to the present embodiment, when a recording instruction to record a moving image is given during a dubbing process, a recording medium from which data to be dubbed is read is selected as the recording destination for the moving image.

Even when the moving image data is recorded, the free capacity available on the recording destination in the dubbing process will not be insufficient, thus avoiding a situation where it is impossible to continue with the dubbing process.

Even when a recording instruction to record a moving image is given during a dubbing process, when a recording medium with a relatively high data writable rate, such as an HDD or memory card, is selected as the recording destination for the moving image, the dubbing process may not be interrupted, but continued without interruption.

Since the moving image is recorded during the dubbing process, it can prevent the dubbing process from taking a longer time.

In the present embodiment, it has been described that the dubbing process is interrupted in the case where the recording medium on the reproducing side is the optical disk D.

However, the operation is not limited to this case. Alternatively, it may be determined whether the recording of a moving image can be performed without interrupting the dubbing process by comparing the data writable rate to the recording medium on the reproducing side with the data rate of the moving image in the currently set image quality mode.

When the recording of the moving image can be performed without interrupting the dubbing process, the dubbing process is continued without interruption.

Next, a second embodiment will be described.

In the foregoing embodiment, the medium from which data is to be read in the dubbing process is selected as the recording destination medium in response to a request to record a moving image during the dubbing process. In contrast, in the present embodiment, when an instruction to start recording a moving image is given during the dubbing process, the recording destination medium is set to a recording medium other than the recording media on the reproducing side and the recording side in the dubbing process.

The dubbing process is similar to that described in the foregoing embodiment.

In the present embodiment, a process performed when an instruction to start recording is given during the dubbing process is different from that in the foregoing embodiment.

Figure 9:
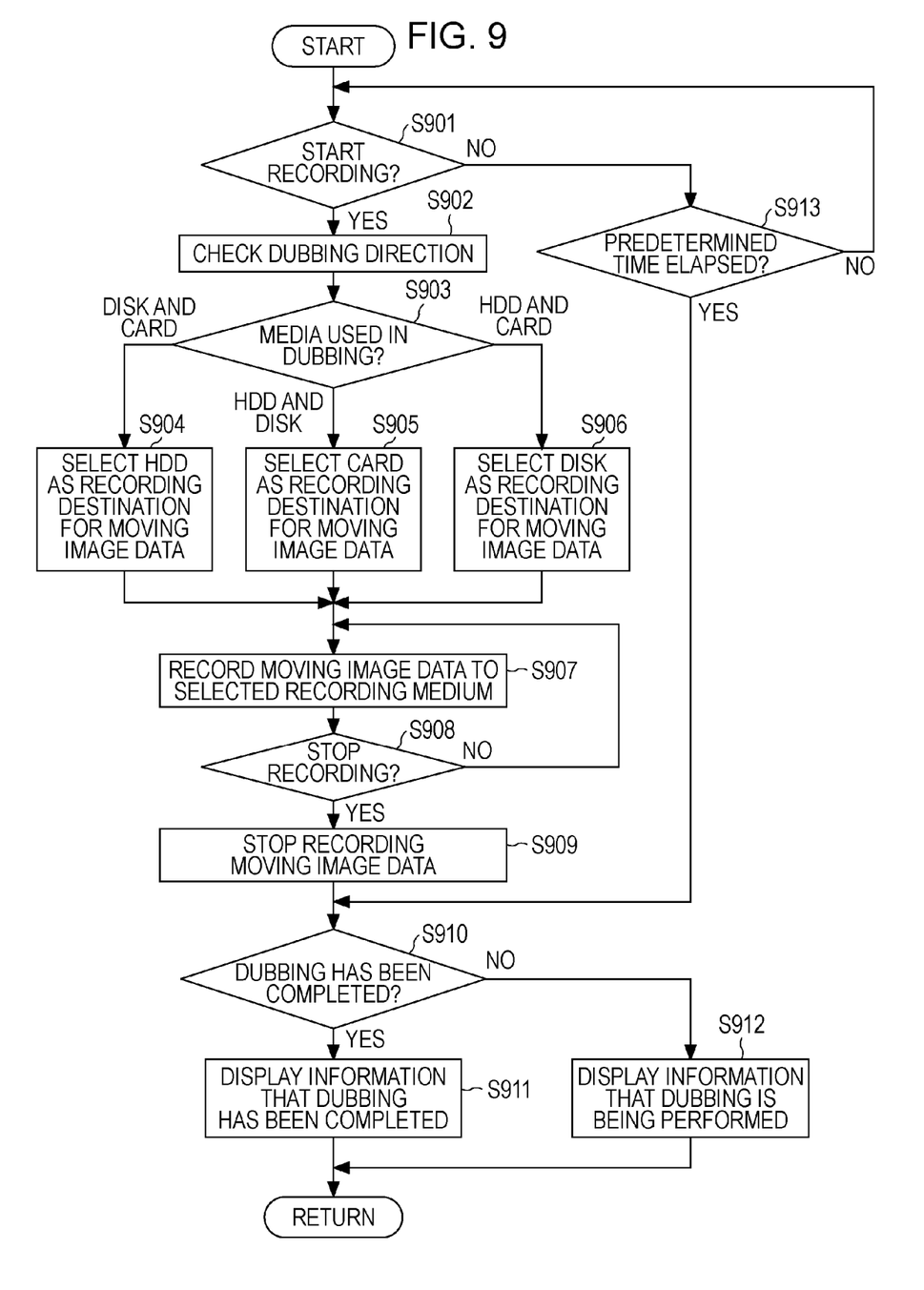
FIG. 9 is a flowchart showing a process performed in response to an instruction to start recording during the dubbing process.

FIG. 9 is a flowchart showing a process performed in response to an instruction given by the user to start recording during the dubbing process. The process shown in FIG. 9 is executed by controlling the components using the CPU 103.

First, when the user operates the start button 202 during the dubbing process, the CPU 103 receives a moving image recording start request and displays a captured moving image on the display unit 106. Then, the CPU 103 waits for a recording start instruction (S901).

When a predetermined time elapses without any recording start instruction being given (yes in S913), the CPU 103 determines whether the dubbing process has been completed (S910). When the dubbing process has been completed (yes in S910), the CPU 103 displays, instead of the captured moving image, a screen indicating that the dubbing process has been completed on the display unit 106 (S911). When the dubbing process has not been completed (no in S910), the CPU 103 displays, instead of the captured moving image, a screen indicating that the dubbing process is being executed on the display unit 106 (S912).

When a recording start instruction is given in S901, the CPU 103 checks the information indicating the dubbing direction, which is saved on the SDRAM 112 (S902). The CPU 103 determines the recording media used in the dubbing process (S903). When the dubbing process is being executed between the optical disk D and the memory card M, the CPU 103 selects the HDD 109 as the recording destination for the moving image data (S904). When the dubbing process is being executed between the optical disk D and the HDD 109, the CPU 103 selects the memory card M as the recording destination for the moving image data (S905). When the dubbing process is being executed between the HDD 109 and the memory card M, the CPU 103 selects the optical disk D as the recording destination for the moving image data (S906).

Next, as in a normal recording process, the CPU 103 records the moving image data on the selected recording medium (S907) and, in response to a recording stop instruction (yes in S908), the CPU 103 stops recording (S909).

The CPU 103 determines whether the dubbing process has been completed during the recording of the moving image data (S910). When the dubbing process has been completed (yes in S910), the CPU 103 displays information indicating that the dubbing process has been completed on the display unit 106 (S911). When the dubbing process has not been completed (no in S910), the CPU 103 displays a screen indicating that the dubbing process is being executed on the display unit 106 and continues with the dubbing process without interruption (S912).

In this manner, according to the present embodiment, when a recording instruction to record a moving image is given during a dubbing process, a recording medium other than recording media relating to the dubbing process is selected as the recording destination for the moving image.

Even when the moving image data is recorded, the free capacity available on the recording destination in the dubbing process will not be insufficient, thus avoiding a situation where it is impossible to continue with the dubbing process.

Since the dubbing process can be continued without interruption, it can prevent the dubbing process from taking a longer time since the moving image is recorded during the dubbing process.

In the present embodiment, when no recording media other than those relating to the dubbing process are mounted, as in the foregoing embodiment, the recording medium on the reproducing side is selectable as the recording destination for the moving image data.

Specifically, for example, when the optical disk D is not mounted, and when data on the HDD 109 is being dubbed to the memory card M, the HDD 109, which is on the reading side, is selected as the recording destination for the moving image.

In the present embodiment, an apparatus that records/reproduces data to/from three recording media, namely, an HDD, optical disk, and memory card, has been described. However, an apparatus that records/reproduces data to/from four or more recording media can also be employed. The present invention is similarly applicable to this case.

Other Embodiments

The present invention includes the case in which the functions of the foregoing embodiments are achieved by supplying a computer program for realizing the functions of the foregoing embodiments to a system or apparatus in a direct manner or from a remote place. In that case, the computer program is read and executed by a computer included in the system or the like.

Therefore, since the functions of the foregoing embodiments are realized with a computer, the computer program installed in the computer itself realizes the present invention.

In that case, the computer program may be in any format as long as it has the functions of a program, such as object code, a program executed by an interpreter, or script data supplied to an operating system (OS).

Recording media (storage media) for supplying the program include, for example, a flexible disk, a hard disk, an optical disk, and a magneto-optical (MO) disk. Besides the foregoing disks, the recording media include, for example, a compact-disc read-only memory (CD-ROM), a compact-disc-recordable (CD-R), a compact-disc rewritable (CD-RW), a magnetic tape, a non-volatile memory card, a ROM, and DVDs (DVD-ROM and DVD-R).

Besides the computer executing the read program to realize the functions of the foregoing embodiments, the functions of the foregoing embodiments can also be realized by performing, with the OS or the like running on the computer, part or the entirety of the actual processing in accordance with an instruction of the program.

Furthermore, the functions of the foregoing embodiments can also be realized by writing a program read from a recording medium to a memory of a function expansion board inserted in a computer or a function expansion unit connected to the computer and executing, with a CPU included in the board or the like, part or the entirety of the actual processing.

While the present invention has been described with reference to exemplary embodiments, it is to be understood that the invention is not limited to the disclosed exemplary embodiments. The scope of the following claims is to be accorded the broadest interpretation so as to encompass all modifications and equivalent structures and functions.

This application claims the benefit of Japanese Application No. 2007-230615 filed Sep. 5, 2007, which is hereby incorporated by reference herein in its entirety.

What is claimed is:

1. A recording apparatus that records data on a plurality of recording media, the recording apparatus comprising:
   an input unit which receives data;
   a recording and reproducing unit which records and reproduces the data on and from the plurality of recording media; and
   a controller which controls the recording and reproducing unit to execute a dubbing process of reading data from a recording medium on reading side and recording the read data on a recording medium on recording side and generates management information for discriminating the recording medium on reading side in the dubbing process,
   wherein, during the dubbing process, in response to a recording instruction to record input data received by the input unit, the controller selects the recording medium on reading side as a recording medium on which the input data is to be recorded in response to the recording instruction from among the plurality of recording media based on the management information and controls the recording and reproducing unit to record the input data on the recording medium on reading side.

2. The recording apparatus according to claim 1, wherein, in a case where the recording medium on reading side is a predetermined type of recording medium, the controller controls the recording and reproducing unit to interrupt the dubbing process and thereafter to record the input data on the selected recording medium on reading side.

3. The recording apparatus according to claim 2, wherein, in a case where the recording medium on reading side is not a predetermined type of recording medium, the recording and reproducing unit continues the dubbing process and thereafter to record the input data on the selected recording medium on reading side.

4. The recording apparatus according to claim 1, wherein the data is image data, the recording apparatus further comprising:
   a display unit which displays an image relating to input image data received by the input unit on a display device, and
   wherein, in response to the recording instruction during the dubbing process, the controller controls the display unit to display the image relating to the input image data on the display device.

5. The recording apparatus according to claim 4, wherein, during the dubbing process, the controller controls the display unit to display information indicating that the dubbing process is being executed on the display device and, in response to the recording instruction during the dubbing process, the controller controls the display unit to display the image relating to the input image data.

6. A recording method for a recording apparatus including an input unit which receives data and a recording and reproducing unit which records and reproduces the data on and from a plurality of recording media, the recording method comprising:
   controlling the recording and reproducing unit to execute a dubbing process of reading data from a recording medium on reading side and recording the read data on a recording medium on recording side and generating management information for discriminating the recording medium on reading side in the dubbing process; and
   during the dubbing process, in response to a recording instruction to record input data received by the input unit, selecting the recording medium on reading side as a recording medium on which the input data is to be recorded in response to the recording instruction from among the plurality of recording media based on the management information controlling the recording and reproducing unit to record the input data on the recording medium on reading side.

7. A recording apparatus that records data on a plurality of recording media, the recording apparatus comprising:
   an input unit which receives data;
   a recording and reproducing unit which records and reproduces the data on and from the plurality of recording media; and
   a controller which controls the recording and reproducing unit to execute a dubbing process of reading data from a recording medium on reading side and recording the read data on a recording medium on recording side and generates management information for discriminating the recording medium on reading side in the dubbing process, wherein, during the dubbing process, in response to a recording instruction to record input data received by the input unit, the controller detects the recording medium on recording side from among the plurality of recording media based on the management information and controls the recording and reproducing unit to record the input data on a recording medium other than the detected recording medium on recording side.

8. The recording apparatus according to claim 7, wherein, in a case where the recording medium on reading side is a predetermined type of recording medium, the controller controls the recording and reproducing unit to interrupt the dubbing process and thereafter to record the input data on the recording medium on reading side.

9. The recording apparatus according to claim 7, wherein, in a case where the recording medium on reading side is not a predetermined type of recording medium, the recording and reproducing unit continues the dubbing process and thereafter records the input data on the recording medium on reading side.

10. A recording method for a recording apparatus including an input unit which receives data and a recording and reproducing unit which records and reproduces the data on and from a plurality of recording media, the recording method comprising:

controlling the recording and reproducing unit to execute a dubbing process of reading data from a recording medium on reading side and recording the read data on a recording medium on recording side and generating management information for discriminating the recording medium on reading side in the dubbing process; and during the dubbing process, in response to a recording instruction to record input data received by the input unit, detecting the recording medium on recording side from among the plurality of recording media based on the management information and controlling the recording and reproducing unit to record the input data on a recording medium other than the detected recording medium on recording side.

* * * * *